US008762245B1

(12) United States Patent
Stensrud et al.

(10) Patent No.: US 8,762,245 B1
(45) Date of Patent: Jun. 24, 2014

(54) METHOD AND SYSTEM FOR PROVIDING AN IMMEDIATE VARIABLE ANNUITY

(76) Inventors: Lorry J. Stensrud, Lake Forest, IL (US); Timothy E. Hill, Grayslake, IL (US)

( * ) Notice: Subject to any disclaimer, the term of this patent is extended or adjusted under 35 U.S.C. 154(b) by 297 days.

(21) Appl. No.: 12/769,378

(22) Filed: Apr. 28, 2010

Related U.S. Application Data

(60) Provisional application No. 61/214,847, filed on Apr. 29, 2009.

(51) Int. Cl.
*G06Q 40/00* (2012.01)
(52) U.S. Cl.
USPC ............... 705/36 R; 705/35; 705/37; 705/39; 705/4

(58) Field of Classification Search
USPC ............................................ 705/36 R, 15–45
See application file for complete search history.

(56) References Cited

U.S. PATENT DOCUMENTS

| | | | |
|---|---|---|---|
| 5,732,397 A | | 3/1998 | DeTore et al. |
| 6,611,815 B1 * | | 8/2003 | Lewis et al. ............... 705/36 R |
| 7,089,201 B1 * | | 8/2006 | Dellinger et al. ............... 705/35 |
| 7,376,608 B1 | | 5/2008 | Dellinger et al. |

OTHER PUBLICATIONS

"Understanding and managing VUL", Baldwin, Ben G Jr. Journal of the American Society of CLU & ChFC. Bryn Mawr: Sep. 1996. vol. 50, iss. 5, p. 82.*
Ohio Nat'l Life Assurance releases new VUL product, Koco, Linda. National Underwriter. Mar. 15, 1993. vol. 97, Iss. 11; p. 17.*
A personal insurance and retirement plan for the self-directed investor, Freeman, Richard B. The CPA Journal. New York:Feb. 1995. vol. 65, Iss. 2, p. 69.*

* cited by examiner

*Primary Examiner* — Hai Tran
(74) *Attorney, Agent, or Firm* — McDermott, Will & Emery LLP

(57) ABSTRACT

A computerized method of providing an investment product that determines a provisional payment amount based upon investment returns. The provisional payment amount is compared to a payment cap and a payment floor. An actual payment amount is set as the provisional payment amount if the provisional payment amount is between the payment floor and the payment cap. The actual payment amount is set as the payment cap if the provisional payment amount is above the payment cap, or at the payment floor if the provisional payment is below the payment floor. The difference between the provisional payment amount and the payment cap or the payment floor is added to or subtracted from an individual bank value account. A cash surrender value is provided when the total of the payments made is less than an initial investment amount. A death benefit is provided that includes a balance of the individual bank value account and the cash surrender value.

14 Claims, 5 Drawing Sheets

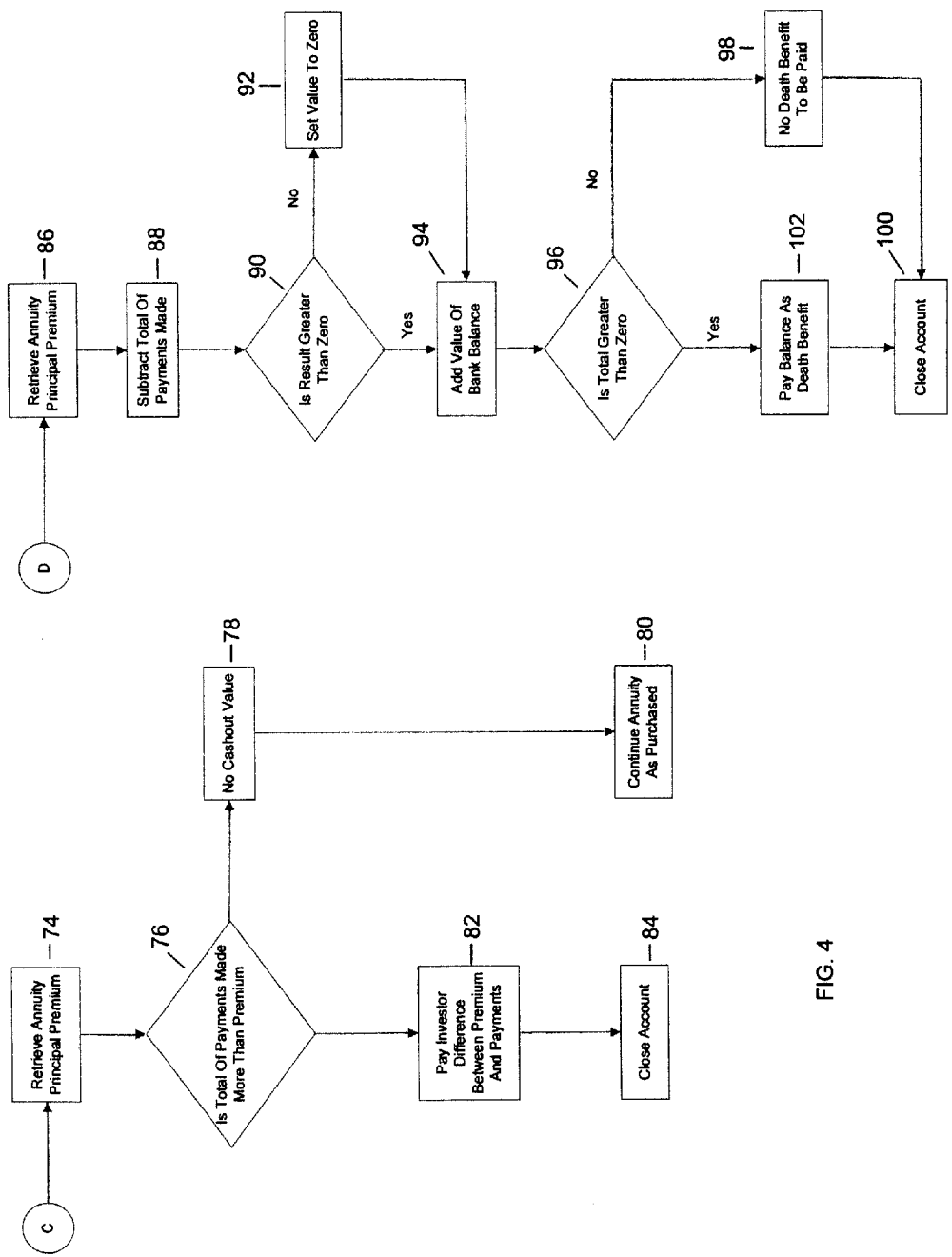

FIG. 6a

Premium = 200,000
AIR 3%

| Year (First year can be any yr after 1983) | Age | Payment (BOY)* | Payment Increase | CSV | EOY Banked Amount | Death Benefit | S&P 500 Return | SB BIG Return | Total (less 150 bps in Asset Fees) | Inflation (CPI – U, All Items) |
|---|---|---|---|---|---|---|---|---|---|---|
| | A | B | C | D | E | F | G | H | I | J | K |
| 1984 | 65 | 14,000 | | 186,000 | – | 186,000 | 6.2% | 15.0% | 8.2% | 5.0% |
| 1985 | 66 | 14,712 | 5.1% | 172,288 | – | 171,288 | 31.7% | 22.3% | 26.4% | 5.0% |
| 1986 | 67 | 15,594 | 6.0% | 155,694 | 2,465 | 158,159 | 18.7% | 15.4% | 15.0% | 5.0% |
| 1987 | 68 | 16,530 | 6.0% | 139,164 | 6,252 | 145,417 | 5.3% | 2.6% | 2.7% | 4.4% |
| 1988 | 69 | 17,423 | 5.4% | 121,742 | 9,092 | 130,834 | 16.6% | 8.0% | 11.6% | 4.4% |
| 1989 | 70 | 18,363 | 5.4% | 103,378 | 12,690 | 116,068 | 31.6% | 14.4% | 23.2% | 4.6% |
| 1990 | 71 | 19,392 | 5.6% | 83,987 | 19,574 | 103,560 | -3.1% | 9.1% | 0.3% | 6.1% |
| 1991 | 72 | 20,769 | 7.1% | 63,218 | 24,385 | 87,603 | 30.5% | 16.0% | 23.2% | 3.1% |
| 1992 | 73 | 21,620 | 4.1% | 41,598 | 33,352 | 74,950 | 7.7% | 7.0% | 6.1% | 2.9% |
| 1993 | 74 | 22,463 | 3.9% | 19,135 | 42,408 | 61,543 | 10.1% | 9.9% | 8.5% | 2.7% |
| 1994 | 75 | 23,294 | 3.7% | – | 52,322 | 52,322 | 1.3% | -2.8% | -1.9% | 2.7% |
| 1995 | 76 | 24,156 | 3.7% | – | 59,810 | 59,810 | 37.4% | 18.6% | 28.4% | 2.5% |
| 1996 | 77 | 25,002 | 3.5% | – | 74,248 | 74,248 | 23.1% | 3.6% | 13.8% | 3.3% |
| 1997 | 78 | 26,077 | 4.3% | – | 91,745 | 91,745 | 33.4% | 9.6% | 22.4% | 1.7% |
| 1998 | 79 | 26,781 | 2.7% | – | 116,732 | 116,732 | 28.6% | 8.7% | 19.1% | 1.6% |
| 1999 | 80 | 27,477 | 2.6% | – | 149,133 | 149,133 | 21.0% | -0.8% | 10.8% | 2.7% |
| 2000 | 81 | 28,494 | 3.7% | – | 185,047 | 185,047 | -9.1% | 11.6% | -2.3% | 3.4% |
| 2001 | 82 | 29,748 | 4.4% | – | 216,378 | 216,378 | -11.9% | 8.5% | -5.2% | 1.6% |
| 2002 | 83 | 30,521 | 2.6% | – | 242,059 | 242,059 | -22.1% | 10.1% | -10.7% | 2.4% |
| 2003 | 84 | 31,559 | 3.4% | – | 259,214 | 259,214 | 28.7% | 4.2% | 17.4% | 1.9% |
| 2004 | 85 | 32,474 | 2.9% | – | 282,256 | 282,256 | 10.7% | 4.4% | 6.6% | 3.3% |

FIG. 6b

Calculate Next Years Payment

| H S&P 500 Return | I SB BIG Return | J Total (less 150 bps in Asset Fees) | K Inflation (CPI – U All Items) | L Calculated Payment | M Floor | N Cap (Inflation + 1%) | O Support from Positive Bank (Inflation – 1%) | P Actual Payment | Q Change in Bank |
|---|---|---|---|---|---|---|---|---|---|
| 6.2% | 15.0% | 8.2% | 5.0% | $ 14,712 | 14,000 | $ 14,840 | $ – | $ 14,712 | $ – |
| 31.7% | 22.3% | 26.4% | 5.0% | $ 18,059 | 14,712 | $ 15,594 | $ – | $ 15,594 | $ 2,465 |
| 18.7% | 15.4% | 15.9% | 5.0% | $ 20,317 | 15,594 | $ 16,530 | $ 16,218 | $ 16,530 | $ 3,788 |
| 5.3% | 2.6% | 2.7% | 4.4% | $ 20,262 | 16,530 | $ 17,423 | $ 17,092 | $ 17,423 | $ 2,839 |
| 16.6% | 8.0% | 11.6% | 4.4% | $ 21,961 | 17,423 | $ 18,363 | $ 18,015 | $ 18,363 | $ 3,598 |
| 31.6% | 14.4% | 23.2% | 4.6% | $ 26,276 | 18,363 | $ 19,392 | $ 19,024 | $ 19,392 | $ 6,884 |
| -3.1% | 9.1% | 0.3% | 6.1% | $ 25,580 | 19,392 | $ 20,769 | $ 20,381 | $ 20,769 | $ 4,811 |
| 30.5% | 16.0% | 23.2% | 3.1% | $ 30,587 | 20,769 | $ 21,620 | $ 21,203 | $ 21,620 | $ 8,967 |
| 7.7% | 7.6% | 8.1% | 2.9% | $ 31,319 | 21,620 | $ 22,463 | $ 22,031 | $ 22,463 | $ 9,056 |
| 10.1% | 9.9% | 8.5% | 2.7% | $ 33,209 | 22,463 | $ 23,294 | $ 22,845 | $ 23,294 | $ 9,914 |
| 1.3% | -2.8% | -1.9% | 2.7% | $ 31,644 | 23,294 | $ 24,156 | $ 23,690 | $ 24,156 | $ 7,487 |
| 37.4% | 18.6% | 28.4% | 2.5% | $ 39,441 | 24,156 | $ 25,002 | $ 24,519 | $ 25,002 | $ 14,439 |
| 23.1% | 3.6% | 13.8% | 3.3% | $ 43,573 | 25,002 | $ 26,077 | $ 25,577 | $ 26,077 | $ 17,496 |
| 33.4% | 9.6% | 22.4% | 1.7% | $ 51,788 | 26,077 | $ 26,781 | $ 26,259 | $ 26,781 | $ 24,987 |
| 28.6% | 8.7% | 19.1% | 1.6% | $ 59,878 | 26,781 | $ 27,477 | $ 26,942 | $ 27,477 | $ 32,400 |
| 21.0% | -0.8% | 10.8% | 2.7% | $ 64,409 | 27,477 | $ 28,494 | $ 27,944 | $ 28,494 | $ 35,915 |
| -9.1% | 11.6% | -2.3% | 3.4% | $ 61,078 | 28,494 | $ 29,748 | $ 29,178 | $ 29,748 | $ 31,330 |
| -11.9% | 8.5% | -5.2% | 1.6% | $ 56,202 | 29,748 | $ 30,521 | $ 29,926 | $ 30,521 | $ 25,681 |
| -22.1% | 10.1% | -10.7% | 2.4% | $ 48,714 | 30,521 | $ 31,559 | $ 30,948 | $ 31,559 | $ 17,155 |
| 28.7% | 4.3% | 17.4% | 1.9% | $ 55,316 | 31,559 | $ 32,474 | $ 31,843 | $ 32,474 | $ 23,042 |
| 10.7% | 4.4% | 6.6% | 3.3% | $ 57,481 | 32,474 | $ 33,870 | $ 33,221 | $ 33,870 | $ 23,610 |

METHOD AND SYSTEM FOR PROVIDING AN IMMEDIATE VARIABLE ANNUITY

RELATED APPLICATIONS

This application claims priority to U.S. Provisional Patent Application No. 61/214,847 filed on Apr. 29, 2009, and that application is incorporated herein in its entirety by this reference.

TECHNICAL FIELD

The present invention relates to financial services and products and methods for providing the same. More particularly, the present invention relates to a method and system for providing an annuity product that offers an annuity payment and the ability to offer a cash value or a death benefit in addition to the annuity payment.

BACKGROUND OF THE INVENTION

When selecting investment products, investors often look for certain characteristics in a product depending on what stage of life the investor is in. For example, a younger worker may more likely invest in equities, such as stocks and stock based mutual funds that offer high potential returns, but also involve the risk of losing the investors principal. As an investor ages, often times a product that offers more security of principal is favored, even if the return on investment is not as high. One particular type of high security product that many investors turn to later in life are annuities. An annuity allows an investor an obtain an income stream for a period of time, easing concerns the investor may have about outliving their savings.

Several types of annuities exist, each offering an investor different benefits, but each also having certain drawbacks. For example, a fixed annuity gives an investor certainty that they will be receiving a specific payment each month for the term of the annuity. Some fixed annuities additionally offer some type of increasing payment, in an attempt to account for inflation. One drawback of a fixed annuity is that if investments are performing well, the investor does not benefit, as the annuity payment is fixed at the time of purchase.

In order to attempt to obtain investment gains, an investor may select a variable annuity. In a variable annuity the payment the investor receives varies, depending on the return generated by the investment of the annuity. Thus, when the investments are performing favorably, the investor may receive a larger payment, however, if the investment is not performing well, the investor's annuity payment may decrease. If the investment performs very poorly for an extended time, the variable annuity provides an investor with much less income than had been anticipated by the investor when the annuity was purchased. Thus, an investor risks having the income from a variable annuity fall below a level needed to meet living expenses.

Further, if an investor selects an annuity that pays income for a certain period of time, the investor runs the risk of outliving the annuity, and if the investor chooses an annuity that offers payments for life, the amount of each payment will likely be reduced to account for the risk the annuity company faces of the investor living longer than actuarial data predicts. If a payment for life annuity is chosen, and the investor does not live as long as actuarial data predicts, the total amount of payments the investor receives from the purchase of the annuity may not even equal the cost of the annuity. Annuity products do exist that guarantee a certain number of payments, or guarantee that the initial purchase price of the annuity will be returned to the purchaser, but once again, these guarantees often reduce the amount of each payment.

Therefore, with current annuity products, an investor often must choose between a product that offers the potential of higher returns of a variable annuity or a product that offers the safety of a fixed annuity. Similarly, an investor often must choose between a product that will provide a payment for a fixed period, and risk outliving the benefit, or a payment for life, and risk passing away prior to receiving benefits equal to the purchase price of the annuity.

Thus, a need exists for an investment product that offers attractive features of various types of annuities, while limiting the unattractive aspect of any particular annuity, offering the ability to guarantee a payment while offering the opportunity to benefit from market gains and offering a cash value or death benefit available to the investor.

The present invention is provided to solve the problems discussed above and other problems, and to provide advantages and aspects not previously provided. A full discussion of the features and advantages of the present invention is deferred to the following detailed description, which proceeds with reference to the accompanying drawings.

SUMMARY OF THE INVENTION

According to one process, a computerized method of providing an investment product is provided. The method receives investor-specific information from an input device. The investor-specific information is stored on a computer readable medium. Investment options are created using a computer processor based upon the investor-specific information. The method displays investor options on a displaying device. An investment choice is obtained from the investment options, including a principal amount invested. The method periodically calculates an investment payment using the computer processor. The periodic calculation comprises a calculation of a payment floor and a payment cap. A provisional payment amount based upon investment returns is calculated. The method determines whether the provisional payment is between the payment floor and the payment cap. The actual payment amount is set. The method credits a bank value account for the individual investor any amount of the provisional payment amount above the payment cap. The method debits the bank value account for the individual investor an amount required to raise the provisional payment to the payment floor. The method pays the periodic investment payment. A balance of the bank value account for the individual investor is provided to beneficiaries of the investor as a death benefit.

According to another process, a computerized method of providing an investment product determines a provisional payment amount based upon investment returns. The provisional payment amount is compared to a payment cap and a payment floor. An actual payment amount is set as the provisional payment amount if the provisional payment amount is between the payment floor and the payment cap. The actual payment amount is set as the payment cap if the provisional payment amount is above the payment cap and the difference between the provisional payment amount and the payment cap is credited to an individual bank value account. The actual payment amount is set as the payment floor if the provisional payment amount is below the payment floor and the difference between the payment floor and the provisional payment amount is debited to the individual bank value account. The method provides a cash surrender value for the investment product when the total of the payments made is less than an initial investment amount. A death benefit is provided that includes a balance of the individual bank value account and the cash surrender value.

Other features and advantages of the invention will be apparent from the following specification taken in conjunction with the following drawings.

BRIEF DESCRIPTION OF THE DRAWINGS

To understand the present invention, it will now be described by way of example, with reference to the accompanying drawings in which:

FIG. 4 is a flow chart depicting a computerized method of calculating a cash surrender value of an investment product;

FIG. 5 is a flow chart depicting a computerized method of calculating a death benefit of an investment product; and FIGS. 6a and 6b are tables depicting an example of a twenty-year sample of investment returns according to one process of the current invention.

Figure 2:
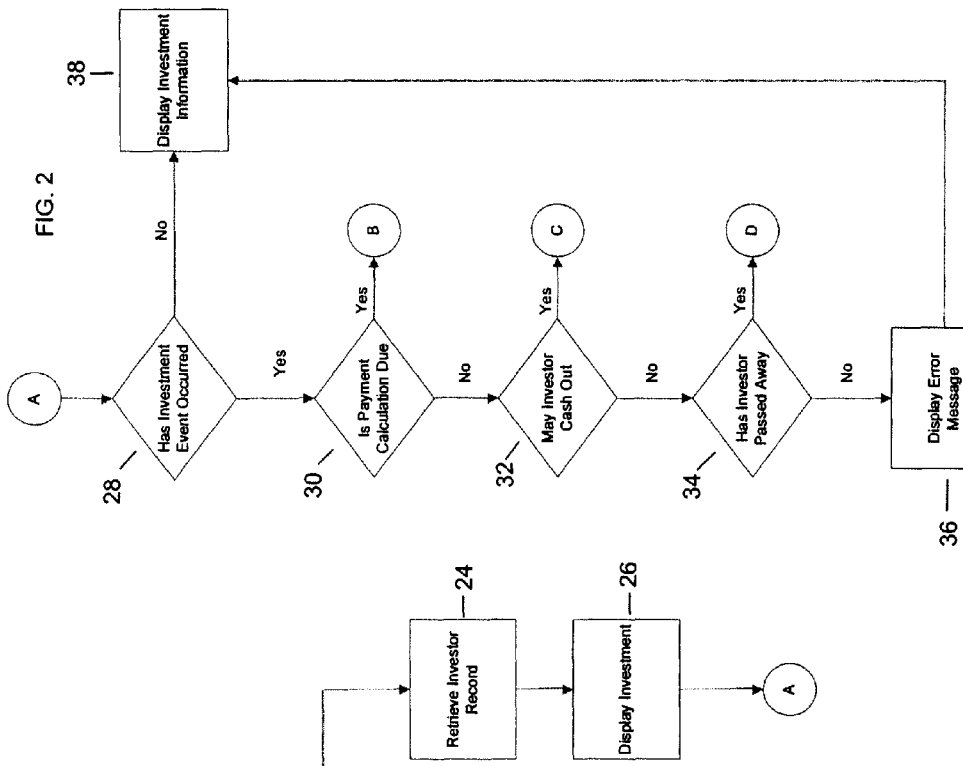
FIG. 2 is a flow chart depicting a computerized method of practicing an embodiment of the present invention.

The components in the drawings are not necessarily to scale, emphasis instead being placed upon clearly illustrating the principles of the present invention.

DETAILED DESCRIPTION

While this invention is susceptible of embodiments in many different forms, there is shown in the drawings and will herein be described in detail preferred embodiments of the invention with the understanding that the present disclosure is to be considered as an exemplification of the principles of the invention and is not intended to limit the broad aspect of the invention to the embodiments illustrated.

Figure 1:
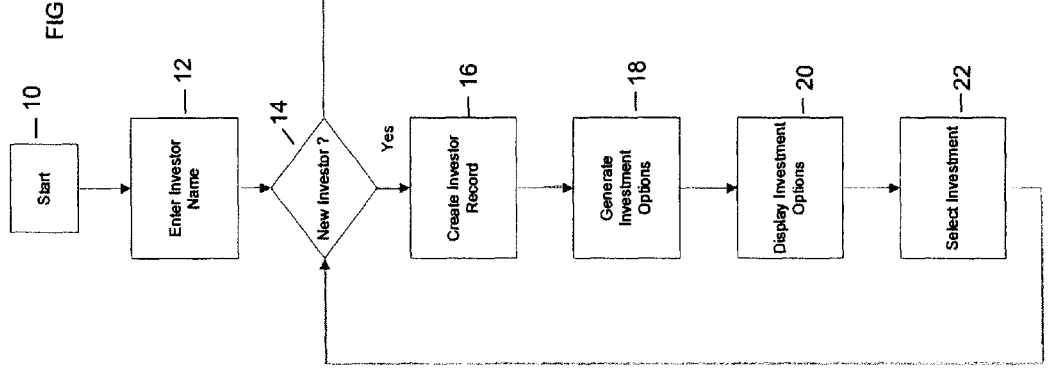
FIG. 1 a flow chart depicting a computerized method of practicing an embodiment of the present invention.

According to one embodiment of the present invention, as shown in FIG. 1 a computerized method of providing an immediate variable annuity is depicted. An investor wishing to purchase an annuity product would contact a representative of an investment company, an insurance company, or other financial adviser (taken collectively to be a "financial adviser") to inquire about an annuity product. The financial adviser may ask the investor certain preliminary questions to ensure that an immediate variable annuity is an appropriate investment for the investor. For example, if the investor has a known need for a large portion of the money that is being used to purchase an annuity, such as for example, the investor plans to make a down payment on a home, a financial adviser may attempt to dissuade the investor from purchasing an annuity. However, assuming that it is appropriate for the investor to purchase an annuity, the financial adviser may initiate a process of providing the investor with the annuity.

As shown in FIG. 1, the method is initiated by the computerized system at block 10 by loading a stored program from a computer readable medium that is utilized to administer the annuity using a computer or network of computers. The method receives information about the investor at block 10. An input device, such as a keyboard, touch screen, mouse, or other computer input device, is utilized to enter information about an investor as shown at block 12. The method determines at block 14 if the investor is a new investor, or if the investor already has an account previously created and stored in the system. If the investor is a new investor, an investor record is created at block 16. The investor record may include a wide variety of information about the investor, including actuarially significant information such as, but not limited to, the investor age, gender, health status, substance usage characteristics, and family medical history. Other investor information that may be entered include information about the investor's investment risk tolerance, so as to offer investment options that are appropriate to the investor. The actuarially significant information may be provided by the investor, or in some situations, by the investor as well as a physician who has examined the investor.

Once the investor information has been entered, a processor utilizes the investor information, along with information stored on a computer readable medium to generate investment options at block 18. The investment options may include the type of investments contained in the annuity based on the investors risk tolerance or income goals. Other consideration that may be included while generating investment options include the term of the investment product, the income required by the investor, and the amount of principal the investor has available to invest. The investment options are presented on a display as shown in block 20. The display may be a computer monitor, or a presentation may be prepared in advance for the investor, such that an easier comparison may be made between various investment options. It is anticipated that several investment options may be presented to the investor, or that simulations may be performed for various situations, such as an investor living a long period of time, the investor living a short period of time, the investments producing above average rates of return, or the investments producing below average rates of return, to allow the investor to carefully choose an investment that is tailored to that investor's goals and needs. After reviewing the investment options, the investor selects an investment product as shown at block 22.

Returning now to block 14, if the investor already has an account, or has already selected an investment, the method retrieves the investor's record at block 24 and displays the investment at block 26.

Figure 3:
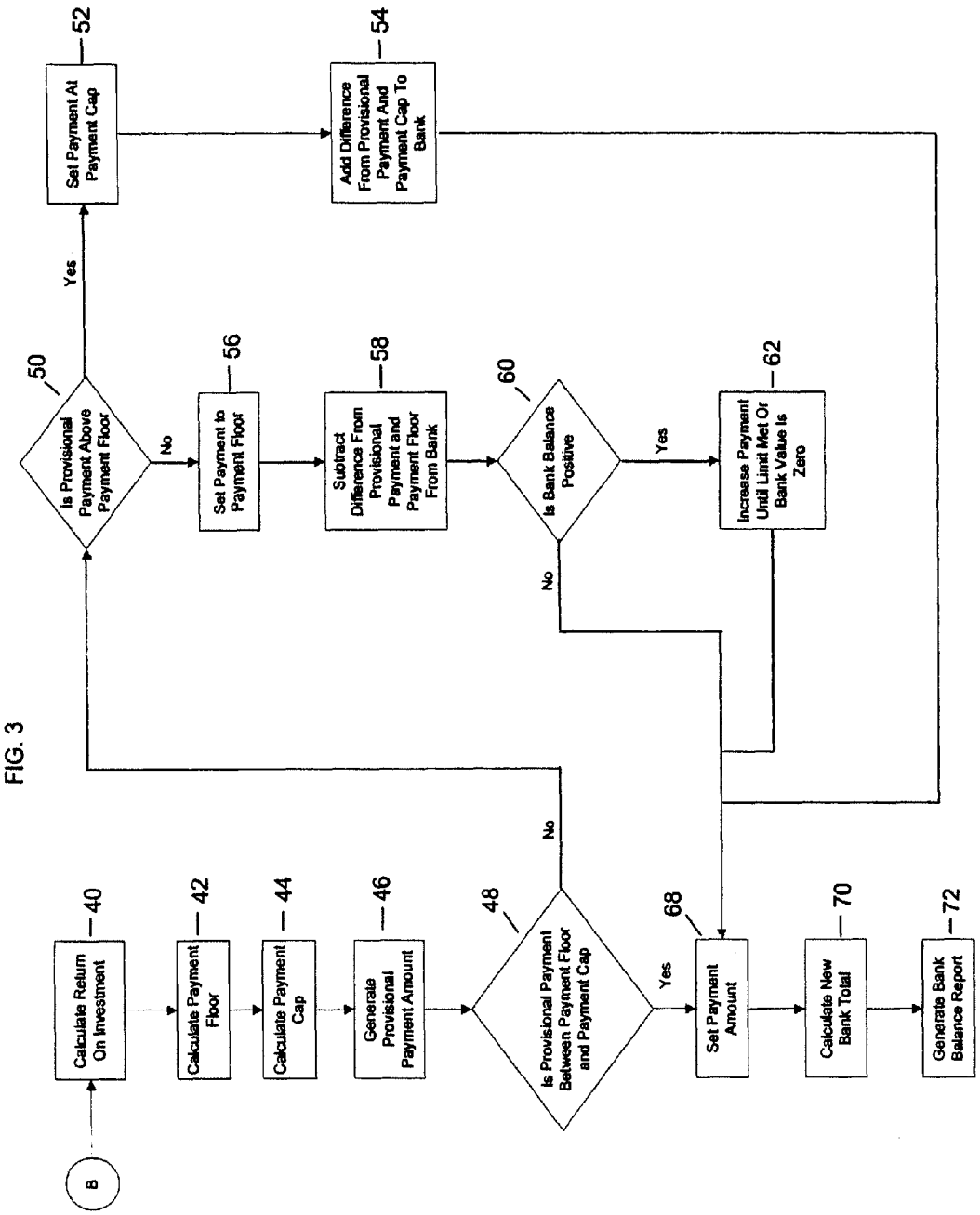
FIG. 3 is a flow chart depicting a computerized method of calculating a payment according to one process of the present invention.

Turning now to FIG. 2, once the investment has been displayed to the investor at block 26, a number of options may exist. As shown at block 28, the method determines if an investment event has occurred. If an investment event has occurred, the method next determines the type of investment event that occurred. As shown at block 30, the first investment event that may occur is a payment calculation. If a payment calculation is required, the method next moves to point B and determines the new payment as shown in FIG. 3 and described in additional detail below. If a payment calculation is not required, the method next determines if the investor is seeking a return of principal initially invested at block 32. If the investor is not seeking a return of principal, the method next determines if a death benefit is to be paid in the event of the death of the investor at block 34. The process of calculating the amount to return to an investor seeking a return of principal is depicted in FIG. 4, while the process of determining the death benefit to pay is shown in FIG. 5. If the process determines that none of the previously identified events have occurred, an error message is generated at block 36, and the method displays information about the investment as shown in block 38.

Turning now to FIG. 3, the calculation of the payment is calculated using a computer processor. As depicted at block 40, the return on investment is calculated. The return on investment is based on the performance of the actual investment choices made by the investor. Once return on investment is determined, the payment floor is determined at block 42.

The payment floor of the annuity product may be a specified percent of the prior year's payment, or a specified percent of the original payment amount. Thus, the investor will always be able to determine the absolute minimum income the investment product will provide. Next, the payment cap is calculated using a processor as shown at block 44. The calculation used to determine the payment cap is set when the investor purchases the investment, and may vary slightly from investment to investment. Typically, the payment cap will be set so that the payment may increase by some percentage over the rate of inflation, or other external measurement, such as a rate of fifty percent (50%) of a return of a 1-year treasury note. It is also contemplated that the payment cap may be a percent above the previous year's payment. For example, in the example embodiment being described, the payment cap is the rate of inflation plus one percent (Inflation+1%), although it is contemplated that other percentage may be used.

As shown at block 46, the method calculates the provisional payment. The provisional payment is determined by comparing the investment return to the assumed interest rate ("AIR") that the annuity provides. Thus, the formula used to determine the provisional payment is: (1+Investment Return)/(1+AIR).

Once the provisional payment is calculated, the calculated provisional payment is compared using a comparator to the payment floor and the payment cap to determine if the calculated provisional payment is between the payment floor and the payment cap as shown at block 48. If the calculated provisional payment is not between the payment floor and the payment cap, the process next determines if the payment is above the payment floor. If the calculated provisional payment is above the payment floor, the actual payment is set to the payment cap as shown at block 52.

Next, the difference from the calculated provisional payment and the payment cap is added to a bank fund of the investment for the investor as shown in block 54. The bank fund is utilized to track the performance of the investment relative to the payment floor and the payment cap. That is, the bank fund will receive a deposit when the investment generates revenue in excess of the amount of money needed to increase the annuity payment to the payment cap, and a withdrawal is made from the bank fund if the payment is below the payment floor, as explained more fully below. Therefore, the bank fund may have a positive balance, such as when the investment is performing above inflation, or the bank balance may be negative, such as if the investment does not perform well enough to provide the previous year's payment.

If the calculated provisional payment was not above the floor at block 50, the payment to be paid to the investor is set to the payment floor as shown at block 56. Next, the process subtracts the differences between the calculated provisional payment and the payment floor and that result is subtracted from the total of the bank fund as shown at block 58. Once the amount required to increase the calculated provisional payment to the payment floor is subtracted from the bank fund, the process next determines if the bank fund has a positive balance as shown in block 60. If the bank fund has a positive balance, the process next determines if the bank balance is sufficient to increase the payment to a predetermined amount, such as the payment cap, as shown at block 62. If the bank fund has a sufficient balance to increase the payment to the predetermined amount, such as the payment cap, the amount required to increase the payment to the predetermined amount, such as the payment cap, is subtracted from the bank. If the bank fund is not sufficient to raise the payment to the predetermined amount, the payment may be increased until the bank balance reaches zero, or some other predetermined value, block 62.

Next, the actual payment is set at block 68, based on the payment value determined previously from one of the blocks 48, 54, or 62 depending on whether the calculated provisional payment was between the payment floor and payment cap, as well as the amount in the bank fund. Once the actual payment is set, the process calculates a new bank fund total at block 70, based upon the performance of the investment and the payment floor and payment cap as explained above. The process additionally generates a payment and bank balance report at block 72 that may be shown to the investor via a display device, or printed and sent to the investor to show the performance of the investment.

It is further contemplated that an alternative process similar to the one depicted in FIG. 3 may additionally determine if the bank fund has a positive balance when the calculated provisional payment is between the payment floor and the payment cap, and if the bank balance is positive, the payment is increased to the payment cap, or until the bank balance reaches zero, or some other predetermined value.

Turning now to FIG. 4, the process for determining the cash surrender value of the investment is depicted. The process for determining the cash payout value of the investment begins by retrieving the premium the investor paid for the annuity product, as shown at block 74. Next, the process retrieves the total value of the payments made to the investor, and compares whether the total payments made exceed the premium paid for the annuity at block 76. If the total payments exceed the premium, the process determines that no payout may be made at block 78, and may either graphically present this information on a display, or create a paper record of this result. Next, as shown at block 80, the process returns to the main menu and the investment would continue based on the terms of the initial purchase.

However, if it is determined that the payments made to the investor do not exceed the premium the investor paid, the process determines the amount the investor will receive for closing the investment as shown at block 82. This determination results in the cash surrender value of the investment and is calculated by subtracting the total of the payments made, as well as any surrender charge, from the premium paid for the investment. It is also contemplated that the surrender charge will be a percent of the difference between the premium and the total amount of the payments already paid to the investor. The method of calculating the surrender charge will be disclosed to the investor prior to the investor purchasing the investment. It is contemplated that the surrender charge will be a fixed percentage of the difference between the premium and the payments already made to the investor, such as fifteen percent (15%). It is also contemplated that the surrender charge may vary over the course of the investment, or may be waived for some period at the beginning of the investment, or for other specific occurrences contained in information provided to the investor regarding the investment. Once the cash surrender payment has been determined, a check is produced or a fund transfer occurs, and the process closes the account, and returns to the main menu, as depicted at block 84.

FIG. 5 depicts the process for determining a death benefit for the investment. The process retrieves the annuity premium from a computer storage medium at block 86. The process deducts the value of the payment made to the investor from the premium paid by the investor for the investment, as shown at block 88. The process next determines if the result of subtracting the payments made from the premium paid is greater than zero, block 90, and the process sets this value to zero if it is negative, block 92. The process retrieves the bank balance and adds the value of the bank balance to a result obtained at block 90 or block 92, as shown at block 94. The processor determines whether the result of adding the bank balance to the result of block 90 or 92 is a positive total at block 96. If the result of block 96 is a negative number, the process determines that no death benefit will be paid, as shown at block 98, and closes the account, as depicted in block 100. If the result of block 96 is positive, the amount is paid as a death benefit, as shown at block 102, and the account is closed, as shown at block 100.

The process described above is carried out via a computer apparatus or computer system. The system includes at least one processor that perform calculations required to implement the process. The computer system also includes a computer readable memory that stores the information related to the investor and the investments. For example, the processor may calculate the investment return based on the performance of the investments of the investor, calculate the payment cap, determine if the bank balance could support an increase in the calculated payment above the payment floor, and evaluate investor information to determine an annuity premium. The computer also includes, or accesses, at least one computer readable medium, such as a disk, ROM, memory card, RAM, CD, or DVD. The computer readable medium stores information utilized in carrying out the process, such as the investor's personal information, actuarial tables, investment options, inflation data, investment performance information, payment history information, and bank balance information.

Turning now to FIGS. 6a and 6b, an example of returns from a specific example of the method is shown giving returns based upon investment results from 1984 to 2004. The investment example depicted in FIGS. 6a and 6b shows an investment having a principal amount of $200,000, made by a 65-year-old, and the assumed interest rate of the investment is 3%. As shown in column A of FIG. 6a, the year is shown. Column B lists the age of the investor. Column C of FIG. 6a depicts the actual payment made to the investor, while column D lists the percent increase of the payment from the previous year. Column E lists the cash surrender value for the investment, while column F lists the bank value for the investment, and column G shows the death benefit for the investment. Column H shows the return for the STANDARD & POOR'S 500® and column I displays the return of an investment grade bond fund. Column J depicts the total return from the investment after management fees have been deducted from the investment. Finally, column K of FIG. 6a shows the rate of inflation.

Turning to FIG. 6b, columns H, I, J, and K from FIG. 6a are repeated. Column L shows the results of the calculated provisional payment. The provisional payment is calculated according to the method described above. Next, column M shows the payment floor to be paid to the investor, the payment floor being the payment from the previous year. Column N depicts the payment cap. The payment cap depicted in columns N of FIG. 6b is the previous year's payment increased by inflation plus one percent. Column O illustrates a payment scenario in which the payment is increased by a rate of inflation minus one percent from the previous years payment, using support from the bank value to increase the payment from the payment floor. Column P depicts the actual payment that will be paid to the investor the next year. Finally, Column Q of FIG. 6b shows the amount added to the bank value based on the difference between the actual payment shown in Column P, and the calculated provisional payment shown in column L.

As shown in FIGS. 6a and 6b, in most of the years between 1984 and 2004, the investment provided a positive rate of return, as may be seen in column J. Additionally, even if the investment return is negative, the payment cap in the example depicted still allows money to be added to the bank value, as the investment return in other preceding years greatly exceeded inflation, thus, causing the payment cap to keep the payment low, and the bank value continues to rise, as shown in columns F and Q. This positive amount flowing to the bank value funds the death benefit, as shown in column G, allowing designated beneficiaries of the investor to receive a portion of the investment income generated over the course of the investment.

Thus, even though the payment cap limits the increase in the size of a payment made to an investor, the payment cap allows the investment to produce a death benefit similar to an insurance policy. Further, the payment cap funds the bank value and may allow the payment to continue to increase above the rate of inflation, even if the investment lost money the previous year, provided the bank value is sufficient.

For example, in 2000-2002, the investment lost money as may be seen in column J, however, the calculated provisional payment in column L for each of those years still greatly exceeded the payment cap depicted within column N for the next year. Thus, the investor will receive a payment, shown in column P, that outpaces inflation, and provides resources that may be utilized to provide support for future payments if investment performance continues to decline, or provides the death benefit payment. Thus, the annuity product offers an investor the ability to obtain a payment that increases in a manner to outpace inflation, and provides sufficient return to also provide a life insurance like death benefit that is based solely on the performance of the investment.

Additionally, the investment allows the investor to always receive a payment equal to the previous year's payment.

It will be understood that a control system may be implemented in hardware to effectuate the method. The control system can be implemented with any or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field programmable gate array (FPGA), etc.

When the control system is implemented in software, it should be noted that the control system can be stored on any computer-readable medium for use by or in connection with any computer-related system or method. In the context of this document, a "computer-readable medium" can be any medium that can store, communicate, propagate, or transport the program for use by or in connection with the instruction execution system, apparatus, or device. The computer-readable medium can be, for example, but is not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a random access memory (RAM) (electronic), a read-only memory (ROM) (electronic), an erasable programmable read-only memory (EPROM, EEPROM, or Flash memory) (electronic), an optical fiber (optical) and a portable compact disc read-only memory (CDROM) (optical). The control system can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

While the specific embodiments have been illustrated and described, numerous modifications come to mind without significantly departing from the spirit of the invention, and the scope of protection is only limited by the scope of the accompanying Claims.

What is claimed is:

1. A computerized method of providing an investment product comprising:
   receiving investor-specific information from an input device;
   storing the investor-specific information on a computer readable medium;
   creating investment options using a computer processor;
   displaying investor options on a displaying device;
   obtaining an investment choice from the investment options, including a principal amount invested;
   periodically calculating and paying a periodic investment payment using the computer processor, periodically calculating the periodic investment payment comprising:
      calculating a payment floor;
      calculating a payment cap;
      calculating a provisional payment amount based upon investment returns;
      determining whether the provisional payment amount is between the payment floor and the payment cap; and
      if the provisional payment amount is above the payment cap, crediting a bank value account for the individual investor by the amount the provisional payment amount is above the payment cap, and setting an actual payment amount to be equal to the payment cap; and
   paying the actual payment amount as the periodic investment payment.

2. The method of claim 1 further comprising providing a balance of the bank value account for the individual investor to beneficiaries of the investor as a death benefit.

3. The method of claim 1 further comprising determining whether a sum of the actual payment amounts exceeds the principal amount invested; and
   allowing a cash payout to the investor if the sum of the actual payment amounts is less than the principal amount invested.

4. The method of claim 1, wherein periodically calculating the periodic investment payment includes, if the provisional payment amount is below the payment floor, debiting the bank value account for the individual investor by an amount required to raise the provisional payment amount to the payment floor and setting the actual payment amount to the payment floor.

5. The method of claim 4 further comprising providing a balance of the bank value account for the individual investor to beneficiaries of the investor as a death benefit.

6. The method of claim 4 further comprising determining whether a sum of the actual payment amounts exceeds the principal amount invested; and
   allowing a cash payout to the investor if the sum of the actual payment amounts is less than the principal amount invested.

7. The method of claim 1, wherein periodically calculating the periodic investment payment includes, if the provisional payment amount is below the payment floor and the bank value account is sufficient to raise the actual payment amount to a predetermined amount that is above the payment floor, debiting the bank value account for the individual investor by an amount required to raise the provisional payment amount to the predetermined amount and setting the actual payment amount to the predetermined amount.

8. The method of claim 1, wherein periodically calculating the periodic investment payment includes, if the provisional payment amount is between the payment floor and the payment cap, setting the actual payment amount to the provisional payment amount.

9. The method of claim 4, wherein periodically calculating the periodic investment payment includes, if the provisional payment amount is between the payment floor and the payment cap, setting the actual payment amount to the provisional payment amount.

10. The method of claim 1, wherein the calculated payment cap comprises a percentage over one of a rate of inflation and a return of a predetermined financial instrument.

11. The method of claim 1, wherein the calculated payment cap comprises a percentage over a previous payment.

12. A physical computer program product, comprising a non-transitory computer usable medium having an executable computer readable program code embodied therein, the executable computer readable program code for implementing a method of determining a periodic payment amount for an investment product using a computer processor, the method comprising:
   retrieving individual investor information from a computer readable medium;
   obtaining return on investment information from the individual investor information;
   generating a provisional periodic payment amount based upon the return on investment information with a computer processor;
   calculating a payment floor based upon a previous periodic payment amount with the computer processor;
   calculating a payment cap based upon inflation data with the computer processor;
   setting a periodic payment amount by:
      (1) determining if the provisional periodic payment amount is between the payment floor and the payment cap using the computer processor;
      (2) setting the periodic payment at the provisional periodic payment amount if the provisional periodic payment amount is between the payment floor and the payment cap;
      (3) otherwise, setting the periodic payment amount at the payment floor if the provisional periodic payment amount is less than the payment floor, or setting the periodic payment amount at the payment cap if the provisional periodic payment amount is more than the payment cap; and
      (4) adding an amount to a bank value account for the individual investor equal to the excess of the provisional periodic payment amount over the payment cap, or subtracting an amount from the bank value account for the individual investor equal to the excess of the payment floor over the provisional periodic payment amount;
   storing the periodic payment amount to the computer readable medium; and
   saving the bank value account for the individual investor to the computer readable medium.

13. The product of claim 12, wherein the method of determining the periodic payment amount further comprises providing a balance of the bank value account for the individual investor to beneficiaries of the investor as a death benefit.

14. The product of claim 12, wherein the method of determining the periodic payment amount further comprises determining whether a sum of periodic payment amounts exceeds a principal amount invested; and allowing a cash payout to the investor if the sum of periodic payment amounts is less than the principal amount invested.

\* \* \* \* \*